US008803681B2

(12) United States Patent
Chen et al.

(10) Patent No.: US 8,803,681 B2

(45) Date of Patent: Aug. 12, 2014

(54) OBJECT FINDER

(75) Inventors: Hung-Cheng Chen, Jhubei (TW); Keng-Hao Chang, New Taipei (TW)

(73) Assignee: FAVEPC Inc., Jhubei (TW)

( * ) Notice: Subject to any disclaimer, the term of this patent is extended or adjusted under 35 U.S.C. 154(b) by 320 days.

(21) Appl. No.: 13/229,240

(22) Filed: Sep. 9, 2011

(65) Prior Publication Data

US 2013/0063261 A1 Mar. 14, 2013

(51) Int. Cl.

*G08B 1/08* (2006.01)
*H04B 7/00* (2006.01)
*H04B 1/10* (2006.01)
*H04B 1/06* (2006.01)

(52) U.S. Cl.

USPC .............. 340/539.1; 340/539.13; 340/539.16; 340/539.32; 340/539.21; 455/277.2; 455/289; 455/269

(58) Field of Classification Search

USPC ..................................... 455/277.1; 340/573.1

See application file for complete search history.

(56) References Cited

U.S. PATENT DOCUMENTS

| | | | | | |
|---|---|---|---|---|---|
| 4,823,290 | A * | 4/1989 | Fasack et al. | | 714/48 |
| 5,450,492 | A * | 9/1995 | Hook et al. | | 380/28 |
| 5,697,075 | A * | 12/1997 | Kim | | 455/133 |
| 5,784,004 | A * | 7/1998 | Esfahani et al. | | 340/854.6 |
| 7,242,917 | B2 * | 7/2007 | Abbasi et al. | | 455/277.1 |
| 2001/0046848 | A1 * | 11/2001 | Kenkel | | 455/277.1 |
| 2004/0046651 | A1 * | 3/2004 | Norimatsu | | 340/445 |
| 2010/0289651 | A1 * | 11/2010 | Beinhocker | | 340/600 |

* cited by examiner

*Primary Examiner* — Jennifer Mehmood
*Assistant Examiner* — Pameshanand Mahase
(74) *Attorney, Agent, or Firm* — Hershkovitz & Associates, PLLC; Abraham Hershkovitz

(57) ABSTRACT

A receiver of an object finder includes an antenna to receive a signal from a transmitter associated with the receiver, a PIN diode having a first terminal coupled with the antenna, and having a resistance that increases as a current flows therethrough decreases, and vice versa, a variable resistor coupled with the first terminal of the PIN diode to control the amount of a current flowing into the PIN diode, and a radio frequency integrated circuit (RF IC) having a first pin electrically coupled with second terminal of the PIN diode to receive the signal from the antenna via the PIN diode.

10 Claims, 4 Drawing Sheets

OBJECT FINDER

BACKGROUND OF THE INVENTION

The present invention generally relates to an object finder and, more particularly, to an object finder capable of locating an object of interest in an adjustable range.

An object finder may include a transmitter and a receiver. The transmitter is generally attached to an object of interest, for example, a child, while the receiver is held by an adult. In operation, the transmitter periodically sends signals to the receiver, which is able to receive the signals in an available range. Once the receiver loses contact from the transmitter, an alarm device of the receiver may be activated to signal the receiver party that the object is out of the range.

Some receivers of object finders on the market may not be user friendly. For example, a super-regenerative receiver may have low signal sensitivity, undesirable stability and low signal-to-noise ratio. To solve this problem, an additional amplifier circuit may be integrated into such receiver product and thus results in higher power consumption and circuit complexity.

As to a super-heterodyne receiver, signals can only be received in a range of a fixed distance from the transmitter. If the transmitter and the super-heterodyne receiver draw closer or go beyond the range, signals coming from the transmitter would no longer be received.

It may therefore be desirable to have an object finder that has a receiver capable of receiving signals in an adjustable distance from the transmitter. It may also be desirable to have an object finder that has a power-saving receiver of relatively high signal sensitivity, desirable stability and signal-to-noise ratio.

BRIEF SUMMARY OF THE INVENTION

Examples of the present invention may provide a receiver of an object finder that comprises an antenna to receive a signal from a transmitter associated with the receiver, a PIN diode having a first terminal coupled with the antenna, and having a resistance that increases as a current flows therethrough decreases, and vice versa, a variable resistor coupled with the first terminal of the PIN diode to control the amount of a current flowing into the PIN diode, and a radio frequency integrated circuit (RF IC) having a first pin electrically coupled with second terminal of the PIN diode to receive the signal from the antenna via the PIN diode.

Additional features and advantages of the present invention will be set forth in portion in the description which follows, and in portion will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, examples are shown in the drawings. It should be understood, however, that the invention is not limited to the precise arrangements and instrumentalities shown in the examples.

In the drawings.

DETAILED DESCRIPTION OF THE INVENTION

Reference will now be made in detail to the present examples of the invention illustrated in the accompanying drawings. Wherever possible, the same reference numbers will be used throughout the drawings to refer to the same or like portions. It should be noted that the drawings are in greatly simplified form and are not to precise scale.

Figure 1:
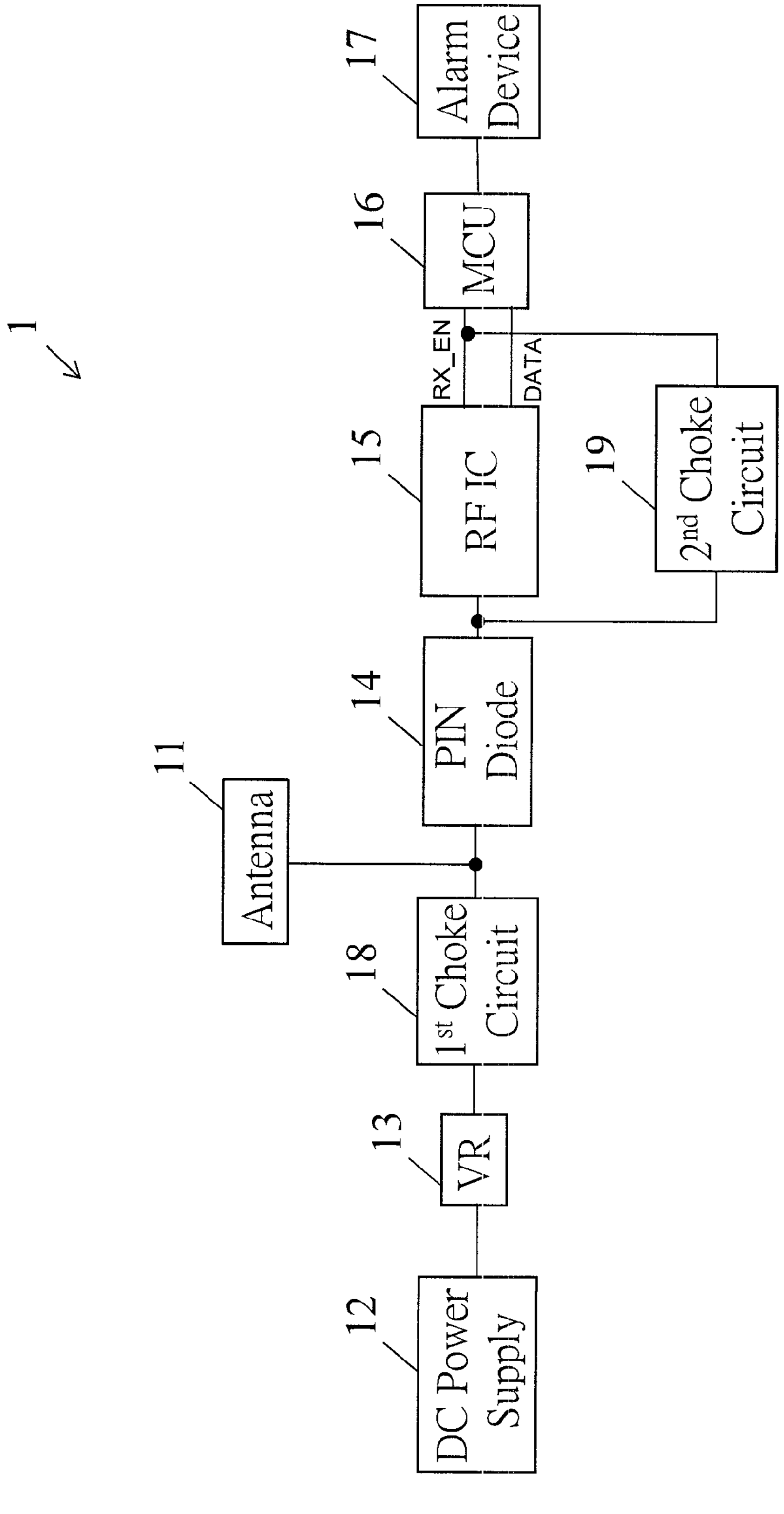
FIG. 1 is a block diagram of a receiver of an object finder in accordance with an example of the present invention.

FIG. 1 is a block diagram of a receiver 1 of an object finder in accordance with an example of the present invention. Referring to FIG. 1, the receiver 1 may include an antenna 11, a direct current (DC) power supply 12, a variable resistor 13, a PIN diode 14, a radio frequency integrated circuit (RF IC) 15, a micro controller unit (MCU) 16, an alarm device 17, a first choke circuit 18 and a second choke circuit 19.

The PIN diode 14, which may be a diode with a wide, lightly doped intrinsic semiconductor region between a p-type semiconductor and an n-type semiconductor region, may work as a linear resistor at relatively high frequencies, for example, ranging from approximately 3 kilohertz to 300 gigahertz. Specifically, the resistance of the PIN diode 14 increases as the current flows therethrough decreases, and vice versa. That is, the resistance of the PIN diode 14 may be substantially inversely proportional to the amount of current flows therethrough within a linear region. In one example, the high-frequency resistance of the PIN diode 14 may vary over a range from approximately 0.1 ohm ($\Omega$) to 10 k$\Omega$. A first terminal (P-terminal) of the PIN diode 14 is connected to the antenna 11 and the first choke circuit 18, and a second terminal (N-terminal) of the PIN diode 14 is connected to the RF IC 15 and the second choke circuit 19.

The RF IC 15, which may be a market available 8-pin IC, includes an input pin coupled with the second terminal of the PIN diode 14 to receive RF signals collected by the antenna 11. The RF IC 15 may also include an enable/disable pin (labeled "RX_EN") connected to the MCU 16 and the second choke circuit 19, and a data pin (labeled "DATA") connected to the MCU 16, which in turn is connected to the alarm device 17. In one example, the RF IC 15 may have signal receiving sensitivity of approximately −100 (minus 100) dbm, which means that a signal of 0 dbm sent from the associated transmitter may be attenuated to −100 dbm when received by the RF IC 15 in a maximum communication distance of 20 meters from the associated transmitter.

The MCU 16 may be configured to enable the RF IC 15 through the RX_EN pin at predetermined time intervals so as to allow the RF IC 15 to receive signals periodically sent from a transmitter associated with the receiver 1. The predetermined time interval depends on the signal transmission period of the transmitter, which may be different as the transmission format or application is different. In one example, the transmitter associated with the receiver 1 transmits a signal in the form of a data packet every other second, and the predetermined time interval is accordingly approximately one second.

The signal or data received at the RF IC 15 may then be sent to the MCU 16 through the DATA pin for processing. The MCU 16 may disable the RF IC 15 as the data are received, and then enter a sleep mode.

In one example, the MCU 16 may include an independent timer (not shown) for counting the predetermined time interval and a memory (not shown) to keep the time a signal is received. The independent timer continues working even when the MCU 16 enters the sleep mode.

The first choke circuit 18 may be connected between the antenna 11 and the variable resistor 13, which in turn is connected to the power supply 12. Furthermore, the second choke circuit 19 is connected between the second terminal of the PIN diode 14 and the enable/disable pin of the RF IC 15.

The variable resistor 13 and the PIN diode 14 may together serve as an attenuator for signal attenuation on a signal transmission path from the antenna 11 to the input pin of the RF IC 15. The amount of signal attenuation may be controlled by changing the resistance of the variable resistor 13. Specifically, when a larger resistance of the variable resistor 13 is selected (by a user of the receiver 1), a weaker current flows through the PIN diode 14 and thus causes a linear change in the resistance of the PIN diode 14 toward a larger impedance, resulting in a larger amount of attenuation on the signal transmission path and in turn a shorter distance of available communication between the receiver 1 and its associated transmitter. Alternatively, when a smaller resistance of the variable resistor 13 is selected, a stronger current flows through the PIN diode 14 and thus causes a linear change in the resistance of the PIN diode 14 toward a smaller impedance, resulting in a smaller amount of attenuation on the signal transmission path and in turn a longer distance of available communication between the receiver 1 and its associated transmitter. According, by changing the resistance of the variable resistor 13, the available communication distance between the receiver 1 and the transmitter may be changed.

In one example, the DC power supply 12 may include but is not limited to a battery that may provide a voltage of 1.5 volt (V). Furthermore, the variable resistor 13 may have a resistance ranging from approximately 0 Ω to 100 kΩ. Accordingly, in one example, when the resistance of the variable resistor 13 is changed to 0Ω, the RF IC 15 may receive signals from approximately 0 to 20 meters away. In another example, when the resistance of the variable resistor 13 is changed to 1KΩ, the RF IC 15 may receive signals from approximately 0 to 3 meters away.

Figure 2:
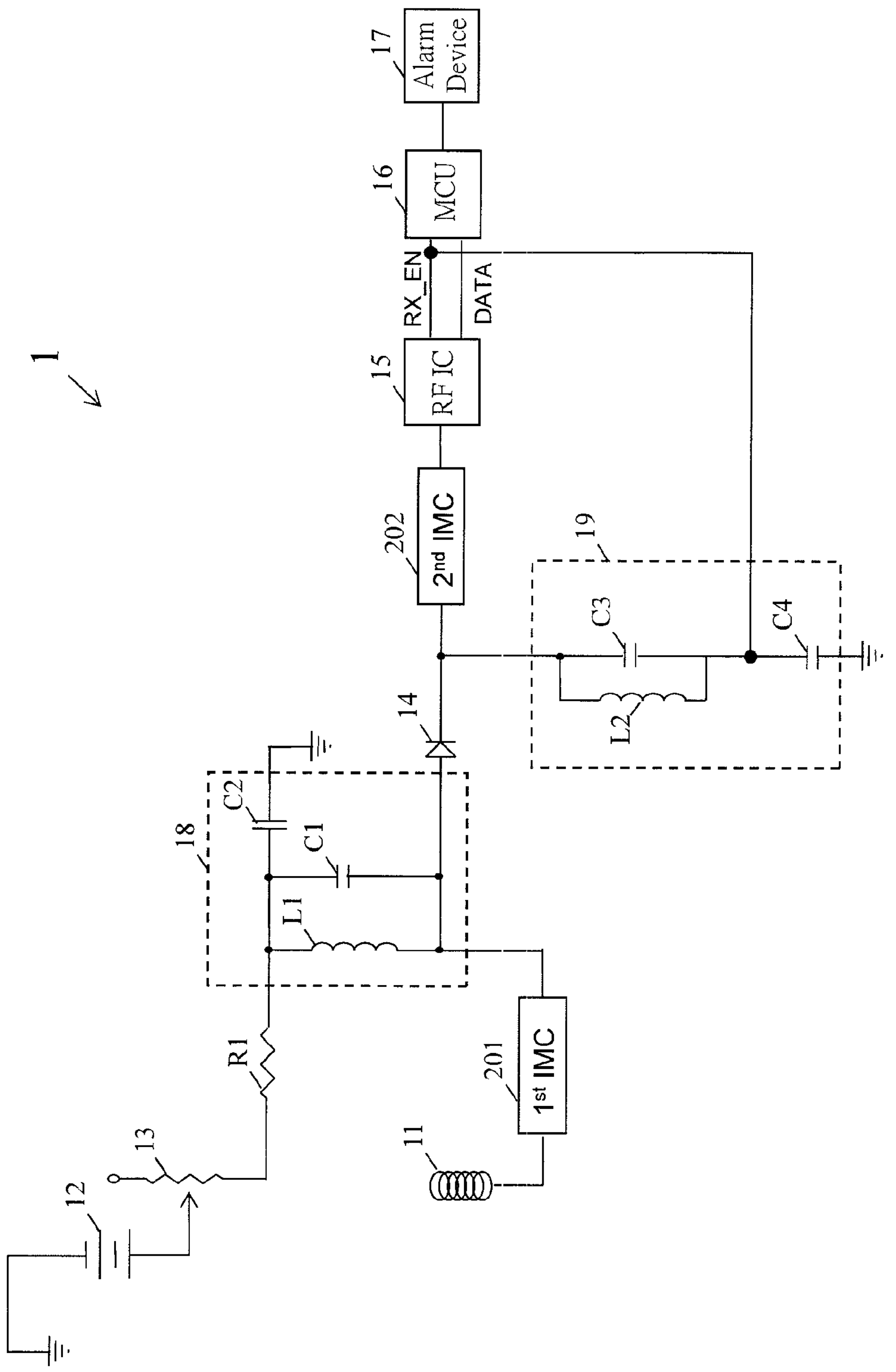
FIG. 2 is a diagram showing the receiver illustrated in FIG. 1 in more detail.

FIG. 2 is a diagram showing the receiver 1 illustrated in FIG. 1 in more detail. Referring to FIG. 2, a first impedance match circuit (IMC) 201 is connected between the antenna 11 and the first choke circuit 18 and a second IMC 202 may be connected between the second terminal of the PIN diode 14 and the input pin of the RF IC 15. Each of the first IMC 201 and the second IMC 202 may include one or more inductor and capacitor. Furthermore, a resistor R1 may be coupled between the variable resistor 13 and the PIN diode 14. The resistor R1, which serves as a current limiting resistor, may work in conjunction with the variable resistor 13 and the PIN diode 14 to determine a desirable distance between the receiver 1 and the transmitter.

The first choke circuit 18 in the present example includes a first capacitor C1 and an inductor L1 connected in parallel with each other to form a parallel resonance circuit. Furthermore, the first choke circuit 18 may also include a second capacitor C2 in series connection with the parallel resonance circuit to eliminate noise and interference. In another example, however, the first choke circuit 18 may include the inductor L1 alone. The first choke circuit 18 may function to prevent the received RF signals at the antenna 11 from leaking through the resistor R1 and the variable resistor 13, thereby ensuring that the received RF signals enter the RF IC 15.

Similarly, the second choke circuit 19 includes a first capacitor C3 and an inductor L2 connected in parallel with each other to form a parallel resonance circuit. The second choke circuit 19 may also include a second capacitor C4 in series connection with the parallel resonance circuit to eliminate noise and interference. Furthermore, in another example, the second choke circuit 19 may include the inductor L2 alone. The second choke circuit 19 may function to prevent the received RF signals at the antenna 11 from leaking through the second capacitor C4 or a path from C4 toward the MCU 16, thereby ensuring that the received RE signals enter the RF IC 15.

The MCU 16 may be configured to provide a voltage signal to the enable/disable pin of the RF IC 15. Specifically, when the MCU 16 determines that the data from the RF IC 15 are received, which means that no other data are to be received until the next transmission period, the RF IC 15 may be disabled. To disable the RF IC 15, the MCU 16 provides a first voltage signal of a relatively high voltage level to the second choke circuit 19, which pulls high the voltage level at the second terminal of the PIN diode 14, thereby turning off the PIN diode 14. Subsequently, the MCU 16 enters a sleep mode, under which the power consumption of the receiver 1 may be significantly decreased.

As the next transmission period occurs, the MCU 16 wakes up from the sleep mode and resumes to an active mode to enable the RF IC 15 for receiving data. To enable the RF IC 15, the MCU 16 provides a second voltage signal of a relatively low voltage level to the second choke circuit 19, which pulls low the voltage level at the second terminal of the PIN diode 14, thereby turning on the PIN diode 14.

The MCU 16 may determine if the data transmitted at a transmission period are completely received. If not, the MCU activates the alarm device 17 to go off sound or light. In one example, the alarm device 17 may include a buzzer that may output audio signals. In another example, the alarm device 17 may include a light-emitting diode (LED) that may output optical signals.

Figure 3:
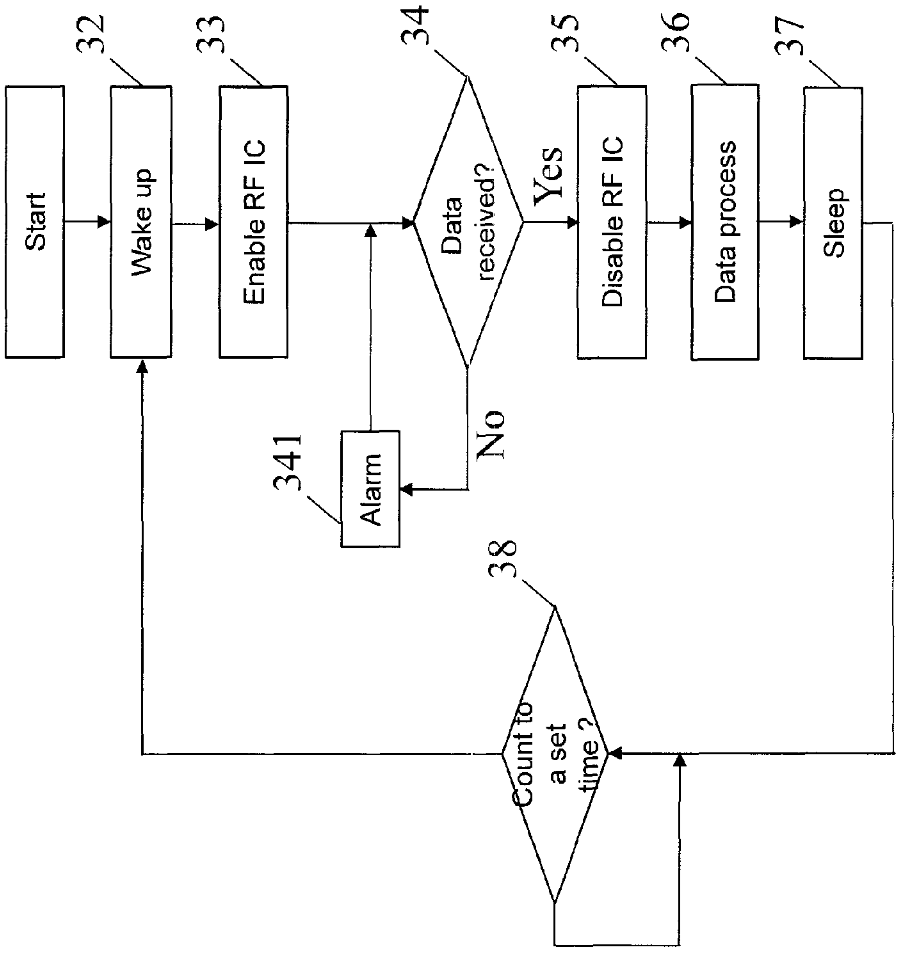
FIG. 3 is a flow diagram of a method of operating the receiver illustrated in FIG. 1 in accordance with an example of the present invention.

FIG. 3 is a flow diagram of a method of operating the receiver 1 illustrated in FIG. 1 in accordance with an example of the present invention. Referring to FIG. 3, at step 32, the MCU 16 may wake up from a sleep mode in response to the occurrence of a predetermined time interval. The MCU 16 then switches to an active mode, whereby most of the components in the MCU 16 that have become inactive under the sleep mode resume to an active state.

At step 33, the MCU 16 enables the RF IC 15 by, for example, sending a low-voltage signal to the second choke circuit 19, so that the RF IC 15 begins to receive signals from the antenna 11.

At step 34, the MCU 16 determines whether the data to be received at the transmission period have been completely received. If not, the MCU 16 activates the alarm device 17 at step 341 until the data are completely received. If confirmative, the MCU 16 disables the RF IC 15 at step 35 by, for example, sending a high-voltage signal to the second choke circuit 19. The data received at the MCU 16 may include information on a next transmission period, which facilitates the MCU 16 to determine when to wake up.

Next, at step 36, the MCU 16 may process the data received. For example, the MCU 16 may extract the information from the received data, determine the time the next transmission period occurs, and set a counter or timer to count to the time.

After processing the received data, at step 37, the MCU 16 then enters into the sleep mode, under which the timer in the MCU 16 may be still at work, counting until the next transmission time. Once the timer counts to the set time, the MCU 16 wakes up at step 32.

Figure 4:
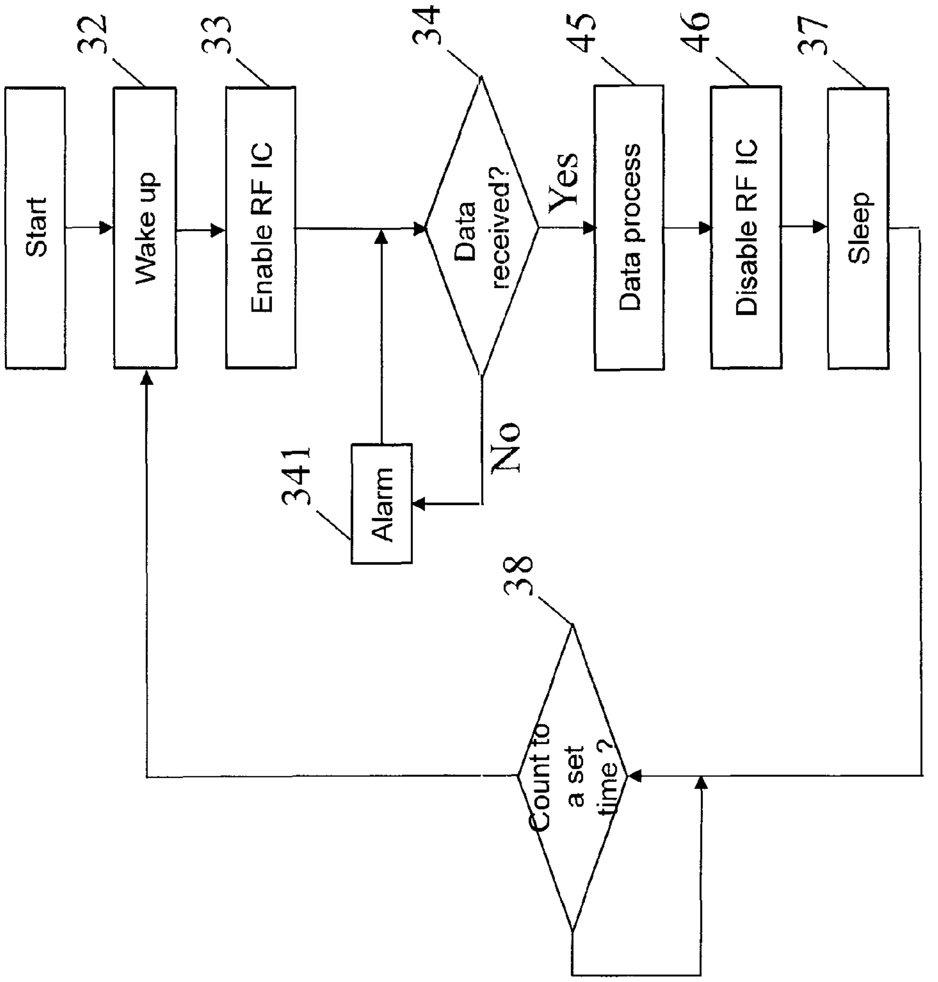
FIG. 4 is a flow diagram of a method of operating the receiver illustrated in FIG. 1 in accordance with another example of the present invention.

FIG. 4 is a flow diagram of a method of operating the receiver 1 illustrated in FIG. 1 in accordance with another example of the present invention. Referring to FIG. 4, the method may be similar to that illustrated in FIG. 3 except steps 45 and 46. Specifically, at step 45, the data are processed when received at the MCU 16. Next, the MCU 16 disables the RF IC 15 and then enters the sleep mode.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A receiver of an object finder, the receiver comprising:

an antenna to receive a signal from a transmitter associated with the receiver;

a PIN diode having a first terminal coupled with the antenna, and having a resistance that increases as a current flows therethrough decreases, and vice versa;

a variable resistor coupled with the first terminal of the PIN diode to control the amount of a current flowing into the PIN diode;

a radio frequency integrated circuit (RF IC) having a first pin electrically coupled with the second terminal of the PIN diode to receive the signal from the antenna via the PIN diode; and a micro controller unit (MCU) electrically coupled with a second pin of the RF IC and a second terminal of the PIN diode, and configured to receive data from the RF IC and to extract information on a next transmission time of the transmitter from the data, wherein the MCU is configured to provide a first voltage signal to disable the RF IC, the first voltage signal pulling high a voltage level at the second terminal of the PIN diode, and to provide a second voltage signal to enable the RF IC, the second voltage signal pulling a low voltage level at the second terminal of the PIN diode, and the MCU being configured to enter a sleep mode after the data are received and configured to set a time to wake up from the sleep mode based on the information extracted from the data.

2. The receiver of claim 1 further comprising an alarm device coupled to the MCU, wherein the MCU is configured to activate the alarm device if the data are not completely received from the RF IC.

3. The receiver of claim 1, wherein the MCU includes a counter to count to the set time.

4. The receiver of claim 1 further comprising a first choke circuit coupled between the antenna and the variable resistor.

5. The receiver of claim 4, wherein the first choke circuit includes an inductor.

6. The receiver of claim 4, wherein the first choke circuit includes an inductor and a first capacitor coupled in parallel with each other to form a resonance circuit, and a second capacitor coupled in series with the resonance circuit.

7. The receiver of claim 1 further comprising a second choke circuit coupled between the second terminal of the PIN diode and the second pin of the RF IC.

8. The receiver of claim 7, wherein the second choke circuit includes an inductor.

9. The receiver of claim 7, wherein the second choke circuit includes an inductor and a first capacitor coupled in parallel with each other to form a resonance circuit, and a second capacitor coupled in series with the resonance circuit.

10. The receiver of claim 1 further comprises a resistor between the PIN diode and the variable resistor.

* * * * *